(12) United States Patent
Jeffries et al.

(10) Patent No.: US 6,336,167 B1
(45) Date of Patent: Jan. 1, 2002

(54) CACHE STORAGE MANAGEMENT USING DUAL STACKS

(75) Inventors: Clark Debs Jeffries, Durham; Ken Van Vu; Mazin Sami Yousif, both of Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/415,416

(22) Filed: Oct. 8, 1999

(51) Int. Cl.[7] .............................................. G06F 12/00

(52) U.S. Cl. ...................................... 711/132; 711/134

(58) Field of Search ................................ 711/132, 134, 711/133, 136, 159, 160

(56) References Cited

U.S. PATENT DOCUMENTS 5,107,457 A * 4/1992 Hayes et al. ................ 711/132
5,893,148 A * 6/1999 Genduso et al. ............ 711/132
6,138,210 A * 10/2000 Tremblay et al. ........... 711/132

* cited by examiner

Primary Examiner—Matthew Kim
Assistant Examiner—C. P. Chace
(74) Attorney, Agent, or Firm—Driggs, Lucas, Brubaker & Hogg, L.P.A.

(57) ABSTRACT

Cache management in a computer system is achieved by using a cache with dual stacks with storage locations for labels associated with data units stored either in the stack or in a separate cache memory unit. The first or preliminary stack is always refreshed following each label request using a conventional Least Recently Used (LRU) algorithm. If the requested label exists in either stack, the conventional LRU algorithm is also used to update the second stack. If the requested label does not exist in either stack and the bottom position in the second stack is empty, the label is written into the top position of the second stack and existing stack entries are pushed down one position. If the bottom position in the second stack is not empty, stack entries at and below a predetermined insertion point (which may be set statically or dynamically) are pushed down, the entry in the bottom position in the stack is discarded and the label is written into the predetermined insertion point in the second stack.

8 Claims, 2 Drawing Sheets

CACHE STORAGE MANAGEMENT USING DUAL STACKS

FIELD OF THE INVENTION

The present invention relates to data processing and more particularly to management of a data storage cache where cache control employs dual stacks.

BACKGROUND OF THE INVENTION

Memory systems in computers generally have two layers: a slow, inexpensive layer for mass storage (main memory) and a fast, more expensive layer (cache) for current use. Main memory is typically implemented in the form of disk storage while cache memory is typically implemented in semiconductor technology.

Cache management is an important aspect of every computer system. The goal is always to cache or store in the fast, more expensive layer of memory those items which will be frequently used in the future but only those items. Choosing which items to store in cache memory is done on the basis of item use history. A primary characteristic of cache performance is hit ratio, the frequency with which memory requests are satisfied using items already stored in the cache. It is well-known that some stored data is accessed more frequently than other stored data. If frequently used main memory, typically disk sectors, can be quickly and accurately identified, the data in such sectors can be moved to cache storage to improve the hit ratio and accelerate data retrieval, thereby boosting overall system performance.

While much of the following discussion is in the context of movement of stored data from main memory to cache memory in computer memory systems, it should be understood that caching techniques can also be useful where tables of calculated values must be constructed and maintained to support other computer processes. An example is a routing table used for making routing decisions in TCP/IP networks. By using caching techniques to build a small routing table containing only frequently used information, it may be possible to boost the overall performance of a router system.

Depending upon the application, cache control can be implemented using either of at least two techniques. According to the first technique, each location in a cache memory is used to store both a data unit to be made available to a computer system and a small, unambiguous label that functions as a pointer to that data unit. According to the second technique, only the labels are stored in the cache control element with the labels serving as pointers or addresses to data units stored in a separate cache memory unit. The first technique may be favored for applications in which the size of the data units is limited since the first technique avoids the need to address a separate cache memory. The second technique may be favored where large data units need to be accommodated. While the following description may refer only to the existence of labels or entries in cache stacks, it should be understood that the description is intended to cover cache systems implemented using either of the two techniques described.

Presently cache maintenance problems are commonly solved with a cache replacement algorithm known as Least Recently Used (LRU). In a computer memory system using LRU for cache management, the cache is refreshed each time a memory request is generated. Initially, all entries in the cache have a default value assumed here to be zero. When a new request can be satisfied using an entry already stored in the cache, the entry is retrieved from the cache without going to main memory. The entry is moved to the top of the cache stack and other entries in the stack are pushed down one position in the stack without changing their relative order.

When a request cannot be satisfied with cached entries, the entry is retrieved from main memory, sent to the requesting system and also written into the position at the top of the stack. Existing stack entries are pushed down one position with the stack entry previously at the bottom of the stack being discarded.

Discussions of LRU, related cache algorithms and their performance can be found at page 378 of *Computer Architecture: a Quantitative Approach*, $2^{nd}$ edition, by J. Hennessy and D. Patterson, published in San Francisco by Morgan Kaufinan in 1990, and in R. Bachrach and Ran El-Yaniv, *Online list accessing algorithms and their applications: recent empirical evidence*, Proceedings of the Eight Annual ACM-SIAM Symposium on Discrete Algorithms, (1997) Vol. 8, pages 53–62.

SUMMARY OF THE INVENTION

The present invention is an improvement over known LRU algorithms which is believed to provide a higher hit ratio and thus an improvement in overall system performance under typical operating conditions.

The invention makes use of a cache storage control having two stacks. The first stack, which may be referred to as a preliminary stack, and the second stack, which may be referred to as the real stack, are preferably but not necessarily the same size; that is, have the same number of storage locations. When a new label request is received, both stacks are checked to determine whether a label already exists in the stacks. If the requested label is found in either stack, it is retrieved from the stack in which it is found and processed to recover the associated data unit. A conventional LRU algorithm of the type discussed above is used to refresh both the first and the second stacks. If the requested label is not found in either stack, the second stack is tested to determine if the bottom stack position is empty. If the bottom position is empty, the requested label (retrieved from a primary data source in a separate operation) is written to the top position of the second stack and all prior stack entries are pushed down one stack location. If the bottom position of the stack is not empty, all existing stack entries at and below a predetermined insertion point are shifted down one position with the label previously at the bottom the stack being discarded. The requested label is then written into the predetermined insertion point in the second stack.

BRIEF DESCRIPTION OF THE DRAWINGS

While the specification concludes with claims particularly pointing out and distinctly claiming that which is regarded as the present invention, details of a preferred embodiment of the invention may be more really ascertained from the following technical description when read in conjunction with the accompanying drawings wherein:

TECHNICAL DESCRIPTION

Figure 1:
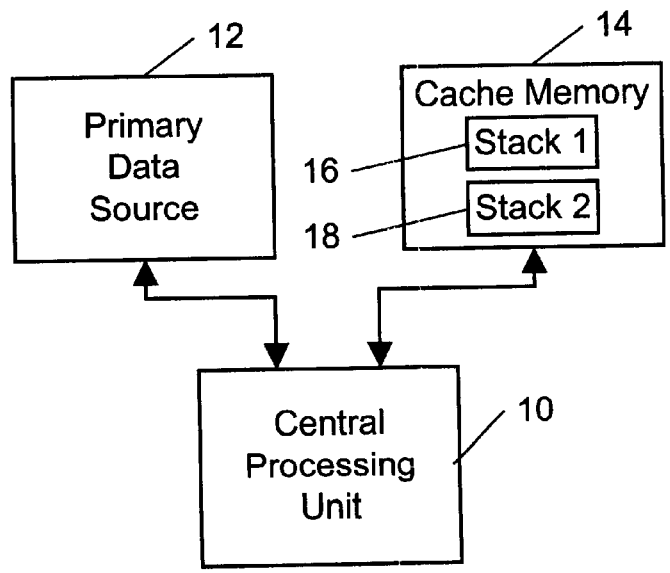
FIG. 1 is a greatly simplified block diagram of a computer system showing the key elements required for implementation of the present invention.

Referring to FIG. 1, an essential component in any caching system includes a central processing unit 10, which is both the source of any requests for stored data and the user of any data retrieved in response to such requests. All data generated or needed for operations by the central processing unit 10 originates with a primary data source 12. The most common type of primary data source would be a computer main memory which, as previously noted, is typically implemented using disk storage device technology. Any other memory technology capable of providing the necessary storage capacity at a commercially reasonable cost can be used for main memory. For environments in which caching is to be used for calculated values, the primary data source may be data processing logic (implemented either as hard-wired logic or as processor controlling routines) which is invoked to calculate the data to be cached, with data typically being calculated on demand. Another essential component in any cache management system is obviously the smaller, faster, more expensive cache memory 14 itself. In a cache memory in accordance with the present invention, at least two access control stacks 16 and 18 are implemented within cache memory 14. As noted above, locations within the stacks can used to store both data units and associated labels or, alternatively, to store only labels with the associated data units actually being stored in a separate cache memory element addressable using the labels.

Obviously, any working computer system also includes many components not shown in the drawing; e.g., input/output devices such as keyboards, pointing devices, monitors, printers, etc. Similarly, the disk storage may either take the form of disk drives using fixed and/or removable recording media. These components, which may be conventional in nature and which are not essential to an understanding of the invention, have been omitted from the drawing for the sake of simplicity.

Figure 2:
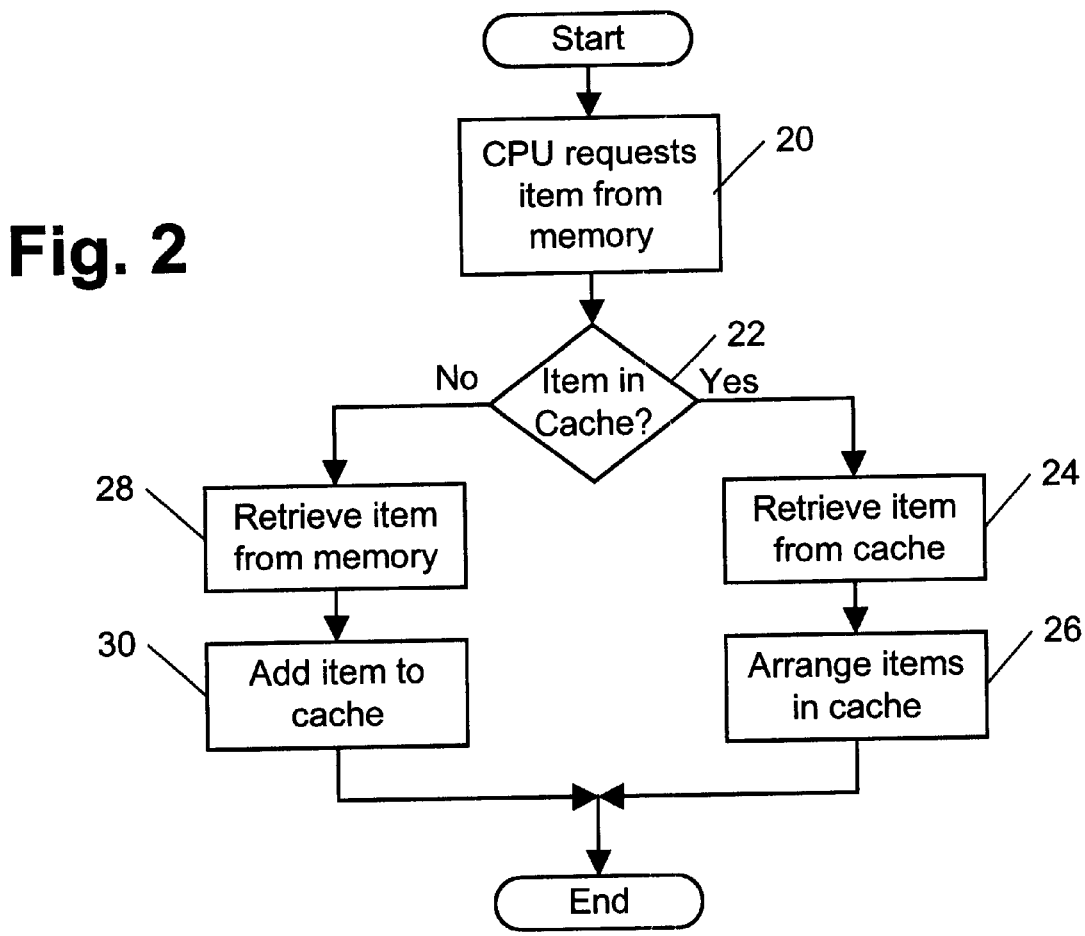
FIG. 2 is a high level flow chart of cache management operations which may be performed using the specific techniques of the present invention.

FIG. 2 is a flow chart of the general process for using a cache. The CPU sends an initial label request to the cache in a step 20. If the request can be satisfied with a label already stored in the cache, as indicated by a test 22, the data unit associated with the cached label is retrieved from its storage location in step 24 and sent to the CPU. The labels in the cache are then rearranged using a cache management algorithm such as the Least Recently Used (LRU) algorithm discussed previously.

If test 22 indicates that a requested label does not exist in the cache, the label is employed in a separate process step 20 to retrieve the associated data unit from the primary data source. The data unit is forwarded to the central processing unit. The label for the retrieved data unit is then written into the cache in step 30 using a suitable algorithm, such as the LRU algorithm, in anticipation that the associated data unit item may again be requested. Typically, labels are arrayed in a single stack of memory locations.

Figure 3:
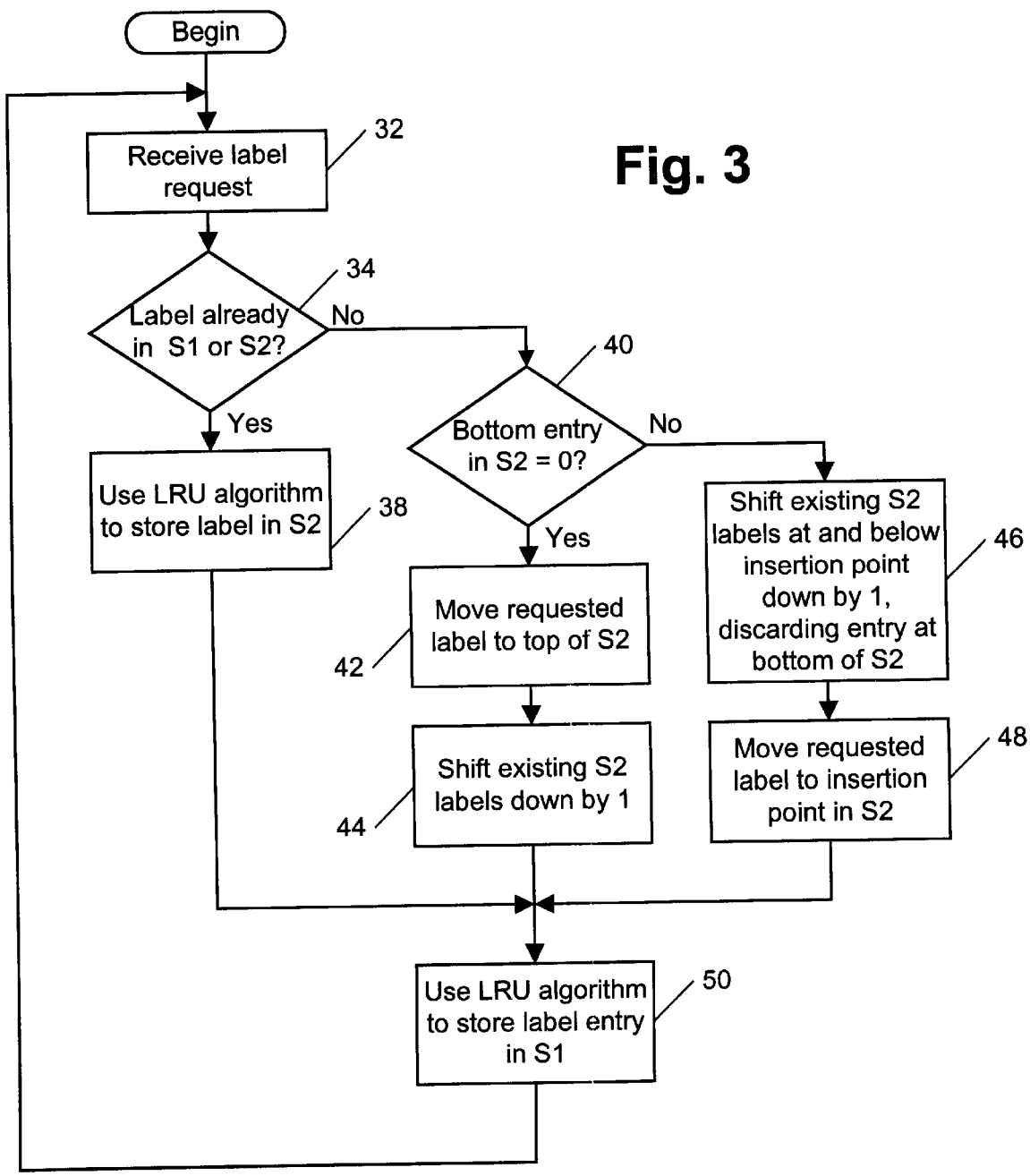
FIG. 3 is a more detailed flow chart of cache management operations performed in accordance with the present invention.

The present invention, as already noted, makes use of a dual stack cache control structure. FIG. 3 is a flow chart of the process for using such a structure. Each time a label request is received in a step 32, a test 34 is conducted to determine whether the label is already stored in either stack S1 or stack S2. If the label is found, it is used to retrieve the associated data, which is then forwarded to the central processing unit.

If the label exists in either of the stacks, the LRU algorithm is used in a step 38 to write or relocate the label entry in the stack S2. Step 38 is followed by a similar step 50 which uses the same LRU algorithm to store the same label entry in stack S1. Once these steps are completed, the cache management routine waits for the next label request.

If the test 34 does not find the label in either of the dual stacks, the label is used in accessing the primary data source to recover the needed data. A slightly more complicated series of steps is performed to control the storage of the label in the stack S2. A test 40 is initially conducted to determine whether the last or bottom position in stack S2 is empty. If the bottom position is empty, the retrieved label is moved to the top of the second stack in an operation 42 and all existing labels in the stack are shifted down by one position without altering their relative order.

If the bottom position in stack S2 is occupied, which it typically is after a period of system operation, all stack entries at and below a predetermined insertion point in stack S2 are pushed down by one position in operation 46 with the label at the bottom of the stack being discarded. The insertion point and various ways in which it can be determined are described below. The new label is then written into the insertion point in S2 in operation 48.

Three different processes have been described for refreshing stack S2, depending on whether the requested label exists anywhere in the cache and whether the bottom position in stack S2 is initially empty. Regardless which of those processes is followed, stack S1 is always refreshed the same way; that is, by using an LRU algorithm in step 50.

As noted above, step 48 calls for a label to be inserted at an insertion point in stack S2, which is a stack location preferably between the top and bottom positions in the stack. The insertion point may be static or dynamic. A static insertion point may be selected by empirical observation of the behavior of the system when different possible insertion points have been tried. Obviously, an insertion point selected in this manner should be one which optimizes the hit ratio for the cache.

Alternatively, the insertion point may be initially assigned in the same manner as a static insertion point and then adjusted up or down as a function of changes in the observed hit ratio for the system. An increasing hit ratio indicates that more label requests are being satisfied using labels already in the cache. To reduce the chances that frequently accessed labels will be "bumped" out of the cache by newly added data, the insertion point may be moved downward in stack S2. Conversely, if the hit ratio has been declining, meaning the cache is losing its effectiveness in satisfying label requests, the insertion point may be moved upward in the stack in the hope that the newly inserted label will be more frequently accessed than at least some of the other labels already in the stack.

Examples of operations of the present invention are included in the following Examples. In all four Examples, stacks S1 and S2 initially contain the same label values arranged in the same order in the four memory locations in each stack. The labels finally contained in the memory locations of each stack vary as a function of whether a requested label is found in one or both of the stacks.

EXAMPLE 1

Assume the memory request is for data having a memory label D

| Stack 1 - initial | Stack 1 - final | Stack 2 - initial | Stack 2 - final |
|---|---|---|---|
| E | D | B | B |
| B | E | G | G |
| C | B | F | D |
| G | C | A | F |

Because the requested label D does not initially exist in either stack S1 or S2, it is shown as being written into S2 at an insertion point in the third position in the stack. Using the conventional LRU algorithm, the label D is written into the top position in stack S1.

EXAMPLE 2

Assume the memory request is for data having a memory label C

| Stack 1 - initial | Stack 1 - final | Stack 2 - initial | Stack 2 - final |
|---|---|---|---|
| E | C | B | C |
| B | E | G | B |
| C | B | F | G |
| G | G | A | F |

Because the requested label C exists initially in stack S1, it is written into the top position of stack S2 using the present invention and also into the top position of stack S1 by applying the conventional LRU algorithm. Label A is discarded from stack S2. No labels need to be discarded from stack S1.

EXAMPLE 3

Assume the memory request is for data having a memory label A

| Stack 1 - initial | Stack 1 - final | Stack 2 - initial | Stack 2 - final |
|---|---|---|---|
| E | A | B | A |
| B | E | G | B |
| C | B | F | G |
| G | C | A | F |

Since the requested label initially exists in stack S2, the same operations that were performed in Example 2 are performed in this Example.

EXAMPLE 4

Assume the memory request is for data having a memory label G

| Stack 1 - initial | Stack 1 - final | Stack 2 - initial | Stack 2 - final |
|---|---|---|---|
| E | G | B | G |
| B | E | G | B |
| C | B | F | F |
| G | C | A | A |

Note that the requested label initially existed in both stacks S1 and S2. The same operations described for Example 2 apply to this Example.

While there has been described what is considered to be a preferred embodiment of the present invention, variations and modifications in the preferred embodiment may occur to those skilled in the relevant art. It is therefore intended that the following claims shall be construed to include both the preferred embodiment and all such variations and modifications as fall within the true spirit and scope of the invention.

What is claimed is:

1. A method of maintaining a cache of data units comprising the steps of:
   maintaining first and second cache stacks, each stack having a plurality of storage locations for storing labels, each said label having an association with a data unit;
   determining whether a requested label is contained in either the first or second stack;
   if the requested label is contained in either the first or second stack, refreshing the contents of the first and the second stacks using a Least Recently Used algorithm;
   if the requested label is not contained in either the first or second stack and the bottom of the second stack is empty,
   storing the requested label at the top of the second stack and pushing down all labels already in the second stack, and
   refreshing the contents of the first stack using a Least Recently Used algorithm; and
   if the requested label is not contained in either the first or second stack and all locations in the second stack are occupied,
   pushing down all labels already in the second stack at or below a predetermined insertion point and discarding the label previously stored at the bottom of said second stack and then storing the requested label at the predetermined insertion point in the second stack, and
   refreshing the contents of the first stack using a Least Recently Used algorithm.

2. A method as set forth in claim 1 wherein the insertion point in the second stack is a storage location between the top and bottom of the stack.

3. A method as set forth in claim 2 including the further steps of:
   measuring cache performance by determining a hit ratio equal to the number of label requests satisfied from cache relative to the total number of label requests; and
   changing the insertion point as a function of the determined hit ratio.

4. A method as set forth in claim 3 wherein the insertion point moves toward the bottom of the second stack when the hit ratio increases and toward the top of the second stack when the hit ratio decreases.

5. An article of manufacture comprising a computer usable medium having a computer readable program embodied in said medium, wherein the computer readable program when executed on a computer causes the computer to:
   maintain first and second stacks in a cache, each stack having a plurality of storage locations for storing labels, each said label having an association with a data unit;
   determine whether a requested label is contained in either the first or second stack;
   if the requested label is contained in either the first or second stack, refresh the contents of the first and the second stacks using a Least Recently Used algorithm;
   if the requested label is not contained in either the first or second stack and the bottom of the second stack is empty,
   store the requested label at the top of the second stack and push down all labels already in the second stack, and
   refresh the contents of the first stack using a Least Recently Used algorithm; and
   if the requested label is not contained in either the first or second stack and all locations in the second stack are occupied,
   push down all labels already in the second stack, discard the label previously stored at the bottom of said second stack, and store the requested label at a predetermined insertion point in the second stack, and
   refresh the contents of the first stack using a Least Recently Used algorithm.

6. A cache storage system comprising:
   a cache storage element having first and second stacks, each stack having a plurality of locations for storing labels, each said label having an association with a data unit;

label request processing logic for determining whether a requested label is contained in either the first or second stack; and stack refresh logic responsive to a determination that a requested label is contained in either the first or second stack to refresh the contents of the first and the second stacks using a Least Recently Used algorithm;

said stack refresh logic being responsive to a determination that the requested label is not contained in either the first or second stack and the bottom of the second stack is empty to store the requested label at the top of the second stack, to push down all labels already in the second stack and to refresh the contents of the first stack using a Least Recently Used algorithm, said stack refresh logic being further responsive to a determination that the requested label is not contained in either the first or second stack and all locations in the second stack are occupied to push down all labels already in the second stack, discard the label previously stored at the bottom of said second stack, store the requested label at a predetermined insertion point in the second stack, and refresh the contents of the first stack using a Least Recently Used algorithm.

7. A system as set forth in claim 6 including:

performance sensitive logic for measuring cache performance by determining a hit ratio equal to the number of label requests satisfied from cache relative to the total number of label requests; and insertion point logic for changing the insertion point as a function of the determined hit ratio.

8. A system as set forth in claim 7 wherein the insertion point logic moves the insertion point toward the bottom of the second stack when the hit ratio increases and toward the top of the second stack when the hit ratio decreases.

\* \* \* \* \*